United States Patent [19]

Lesnansky, Jr.

[11] 3,837,522

[45] Sept. 24, 1974

[54] MULTIPLE RETENTION PLUG FOR SEALING OPENINGS IN METAL PARTS

[75] Inventor: Michael Lesnansky, Jr., Sylmar, Calif.

[73] Assignee: Textron, Inc., Providence, R.I.

[22] Filed: Oct. 9, 1973

[21] Appl. No.: 404,543

[52] U.S. Cl.............................. 220/24.5, 151/14 R
[51] Int. Cl............................................ B65d 39/12
[58] Field of Search............. 220/24.5; 151/14 R, 31

[56] References Cited
UNITED STATES PATENTS 3,135,414   6/1964   Lee.................................... 220/24.5
3,467,157   9/1969   Torre................................. 151/31 X Primary Examiner—William I. Price
Assistant Examiner—Steven M. Pollard
Attorney, Agent, or Firm—Nilsson, Robbins, Bissell, Dalgarn & Berliner

[57] ABSTRACT

A plug for sealing opening in metal parts. The plug includes screw threads for engagement with threads in the metal parts and also includes lands and grooves on the outer surface thereof. Means is provided for expanding the outer surface of the plug into sealing engagement with the surface of the opening in the metal part. The expanding means is a pin forced into an opening provided in the plug through the utilization of a screw, which engages interior threads provided in the opening of the plug. The screw remains in position so as to retain the expanding pin against release as a result of vibrations. An alternative embodiment discloses a ball which is pressed into a small diameter opening in the plug, thus causing the threads at the end of the plug to sealingly engage the threads provided in the opening in the metal part. A pin is then inserted into the opening in the plug to force the lands and grooves to expond into engagement and accomplish a second seal with the inner surface of the opening in the metal part.

7 Claims, 5 Drawing Figures

PATENTED SEP 24 1974 3,897,522

MULTIPLE RETENTION PLUG FOR SEALING OPENINGS IN METAL PARTS

BACKGROUND OF THE INVENTION

It has been found extremely desirable to plug openings provided in metal parts for purposes of assembly, inspection or the like. Structures for accomplishing such sealing have been developed and are disclosed, for example, in U.S. Pat. Nos. 2,821,323 and 3,135,414. Structures of the type disclosed have been found to be vibration and pressure pulsation sensitive in that the expander pin may loosen under heavy vibration loads or loads created by pulsing of fluids under pressure, thus causing the seal between the sealing plug and the opening in the metal part to commence leaking, or under extremely adverse conditions, to become dislodged.

SUMMARY OF THE INVENTION

In accordance with the present invention, there is provided a sealing plug assembly which includes a hollow plug having one closed end and defining screw threads on the outer surface of said one end thereof. The plug is threadable into a threaded opening in a metal part. Expander means is then received within the opening in the hollow plug to expand the outer surface of the plug into sealing engagement with the opening in the metal part.

DETAILED DESCRIPTION OF THE INVENTION

Figure 1:
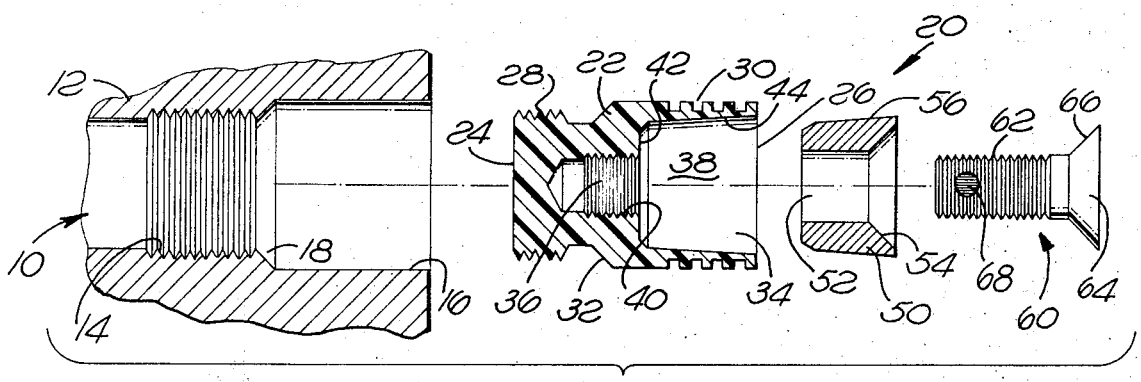
FIG. 1 is an exploded view of a sealing plug assembly in accordance with one embodiment of the present invention.

As shown in FIG. 1, a sealing plug assembly 20 is used to seal an opening 10, formed in a metal part 12. Typically, such metal parts may be actuators, servo-valves, or similar parts of aircraft or other apparatus wherein hydraulic fluids or gases, under high pressure, are utilized. The opening 10 may be required for assembly purposes, filling of fluid, inspection, or the like. After the required operation has been performed, the opening 10 must be closed to provide a seal against leakage of the fluid or gas retained within the part 12. The opening 10 has screw threads 14 formed over an inner portion thereof while an outer portion 16 is smooth. There is provided a shoulder 18 which separates the threaded portion 14 from the smooth portion 16 and provides a function to be described more fully below.

The sealing plug assembly 20 includes a plug 22 having one closed end 24 and one hollow end 26. Adjacent the closed end 24, the plug 22 is exteriorly threaded, as shown at 28. The exteriorly threaded portion 28 of the plug 22 is smaller in outer dimension than is the remainder of the plug. Along the upper portion of the plug 22, there is provided a plurality of lands and grooves 30 which are non-intersecting. A shoulder 32 separates the upper and lower portions of the plug 22 and functions to bottom-out or seat against the shoulder 18 in the opening 10 in the metal part 12, thereby positioning the plug 22 firmly in place for the desired later sealing operation.

The plug 22 defines a blind opening 34, having a first portion 36 and a second portion 38. The first portion 36 is smaller in diameter than the remainder of the opening 34 and defines screw threads 40 therein. The inside wall of the remainder of the opening 34 is tapered so that the sidewalls of the plug 22, wherein the lands and grooves 30 are formed, is thinner at the outer end 26 thereof, than at the shoulder 42 which separates the first and second portions 36 and 38 of the opening 34.

An expander pin 50 provides an opening 52 therethrough and a beveled shoulder 54 at one end thereof. The outer walls 56 of the pin 50 are tapered so as to be received within the opening 38 of the plug 22.

Also provided is a screw 60 having threads 62 adapted for engagement with the threads 40 defined by the opening 36 in the plug 22. A head 64 is tapered as shown at 66 to engage the beveled shoulder 54 on the pin 50. The screw 60 includes a locking insert 68 so that when seated, as will be more fully described below, the screw 60 remains in position even though subjected to heavy stress loads placed thereon by vibrations, pressure pulsation, or the like. A typical insert which may be utilized may be constructed of nylon, or similar plastic material, and a specific example thereof is that which is sold under the trademark NYLOK.

Figure 2:
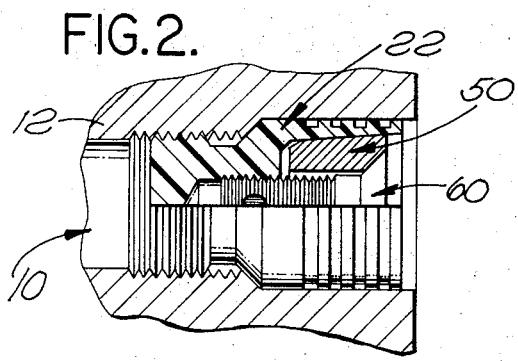
FIG. 2 is a view partly in cross section, of the structure of FIG. 1, in assembled position.

As shown in FIG. 2, the opening 10 may be sealed by seating the shoulder 32 on the plug 22 with the threads 14-28 against the shoulder 18 in the opening 10. It will be understood by those skilled in the art that the diameter of the opening 10 is provided such that the plug 22 will easily fit and be rotatable therein.

After the plug 22 is seated, as above described, the pin 50 is inserted into the opening 38 and hand pushed slightly downwardly until the outer surface 56 engages the inner surface of the opening 38. When such occurs, the screw 60 is inserted through the opening 52 in the pin 50 and is threadably inserted into the threads 40 in the opening 36 of the plug 22. The screw is thereafter seated by inserting an Allen wrench or the like into the head 64 thereof and turning the same so that the shoulder 66 engages the beveled shoulder 54 on the pin, thereby forcing it into the opening 38. As the pin 50 is so forced, the plug 22, particularly the upper portion thereof, is caused to expand outwardly, thereby causing the lands to bite into the smooth surface of the opening 16 in the metal part 12, thereby sealing the opening 10 against leakage of fluid under pressure contained therein. The screw 60 is tightened until the plug 50 has been fully seated in place within the opening 38.

Through the utilization of the screw 60, the seal is retained in place until the screw is removed thus providing means for readily removing the plug 22, should such be desired for any purpose.

That is, by merely removing a screw 60 through the application of force thereto, the pin 50 may then be removed and the plug likewise may be removed to again provide access to the interior of the part 12 through the opening 10 for any purpose desired. However, through use of the locking insert 68, the screw remains in position unless intentionally removed.

Figure 3:
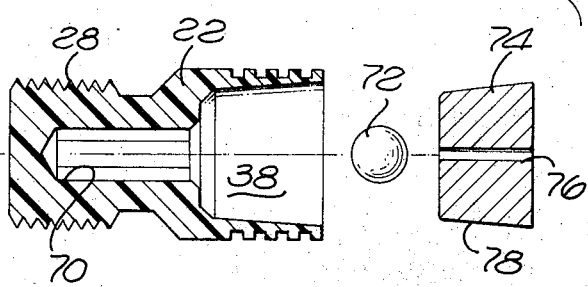
FIG. 3 is an exploded view of the sealing plug assembly in accordance with another embodiment of the present invention.

As shown in FIG. 3, there is provided an alternative embodiment of a sealing plug assembly, constructed in accordance with the present invention. The body 12 is constructed in the same fashion as described with regard to FIG. 1 and therefore will not be further described herein; however, the internal structure of the plug 22 is modified in that there is provided a non-threaded opening 70 in the lower portion thereof. There is provided an additional expander member, such as a ball 72, adapted to be received within the opening 70. The ball 72 has an outer dimension which is greater than the inner dimension of the opening 70. An expander plug 74 is then provided to be received within the opening 38 of the plug 22. The seal has a small opening 76 to relieve pressure that would otherwise build up when the pin is seated.

Figure 4:
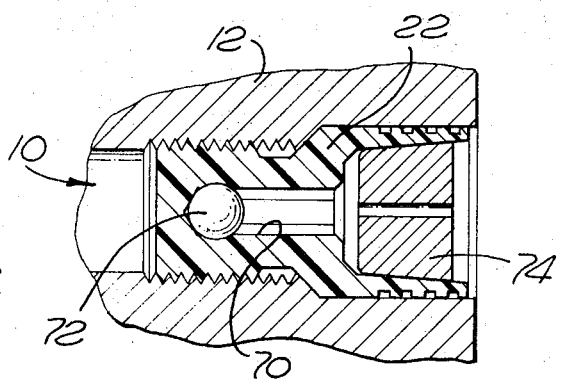
FIG. 4 is a cross-sectional view of the sealing plug assembly illustrated in FIG. 3 but in assembled position; and, FIG. 5 is a cross-sectional view of a further embodiment of a sealing plug assembly constructed in accordance with the present invention shown in assembled form.

As is shown in FIG. 4, the structure illustrated in FIG. 3 is assembled by first threading the plug 22 into position, as above described, in conjunction with FIGS. 1 and 2. Thereafter, the ball 72 is placed internally of the plug 22 and is then pressed in place into the bottom of the opening 70, as illustrated in FIG. 4. By so pressing the ball into place, the threads at 28 on the lower portion of the plug 22 are forced outwardly and effectively extruded into sealing engagement with the threads 14 in the opening 10.

Thereafter, the expander pin 74 is inserted into the opening 38 and is then inserted the desired depth, as shown in FIG. 4, through the utilization of a press or by the utilization of an inserting tool as may be desired. The outer surface 78 of the pin is tapered, as described with respect to the pin 50, so that as the pin is driven into place, the outer surface of the upper portion of the plug is caused to expand into contact with the smooth inner surface 16 of the opening 10, thereby providing a seal therewith. It will be noted by those skilled in the art that there is provided a dual seal by the structure shown in the FIG. 3, first the seal between the threads, and secondly, the seal with respect to the lands in the smooth surface 16 in the opening 10. Although a double seal is provided with the embodiment of the invention shown in FIGS. 3 and 4, it will be recognized that the plug may be removed by withdrawal of the plug and ball and then unscrewing the plug.

Figure 5:
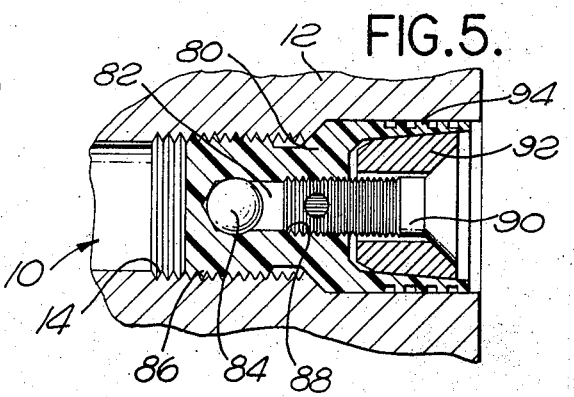

Referring now more specifically to FIG. 5, a third embodiment of a sealing plug assembly constructed in accordance with the present invention is illustrated. As is therein shown, the part 12 has the same type opening 10 with the threads 14 therein as above described in conjunction with FIG. 1; however, the plug is a composite of the structures as illustrated in FIGS. 1 and 2 and FIGS. 3 and 4. That is, the plug 80 includes an opening 82 therein, which receives a ball 84 which causes the threads 86 on the outer periphery of the plug to effectively extrude into the threads 14 on the inner surface of the opening 10, thus providing a fluid seal. The plug 80 also includes threads 88 formed in an enlarged bore portion thereof and which receive the threads formed on screw 90 which presses the expander pin 92 into position so as to cause the lands 94, formed on the outer surface of the upper portion of the plug 80 to engage and form an additional seal with the opening 10 as above described. It will be recognized by those skilled in the art that the structure shown in FIG. 5 also provides a double seal in that the threads 86-14 merge together through the extrusion as a result of the ball 84 forcing the lower portion of the plug to expand and in addition, the lands 94 bite into the surface of the metal 12, to provide a second seal. Also, the screw 90 prevents the expander pin 92 from becoming loosened even under the most adverse conditions as above described and yet may intentionally be removed should such be required.

What is claimed is:

1. A sealing plug assembly for sealing a partially threaded opening in a metal part, the threads in said opening being displaced from the surface of said metal part thereby to provide an unthreaded portion followed by a threaded portion in said opening, said assembly comprising:
   A. a hollow plug, having one closed end defining a blind opening therein, and having an outer surface;
   B. a plurality of threads on the outer surface of said plug adjacent said closed end thereof for threadably engaging said threads in said opening in said metal part;
   C. a plurality of non-intersecting lands and grooves on the outer surface of said plug adjacent the opposite end thereof for engaging said unthreaded portion of said opening in said metal part;
   D. expander means receivable within said blind opening of said plug,
      1. said expander means having a greater diameter than the diameter of said blind opening thereby to expand the outer surface of said plug into sealing engagement with said opening in said metal part.

2. A sealing plug assembly as defined in claim 1, wherein said expander means comprises:
   A. a first member receivable in said blind opening at a position corresponding to said threads on the outer surface of said plug for expanding said threads, and
   B. a second member receivable in said blind opening at a position corresponding to said lands and grooves on the outer surface of said plug for expanding said lands and grooves.

3. A sealing plug assembly as defined in claim 2, wherein said first member is a ball and said second member is a pin.

4. A sealing plug assembly as defined in claim 3, wherein said plug outer surface defines a circumferential shoulder thereon for positioning said plug in said opening in said metal part, the plug between said closed end and said shoulder having a smaller diameter than the remainder thereof, said blind opening having a smaller diameter between said closed end and said shoulder.

5. A sealing plug assembly as defined in claim 1, wherein said blind opening in said plug has first and second portions, said first portion having a smaller diameter than the remainder thereof and being disposed at the bottom of said opening and includes screw threads formed therein, and which further comprises:
   A. a hollow pin receivable in said second portion of said blind opening, and
   B. a screw insertable through said hollow pin into threaded engagement with said screw threads in said first portion to force said hollow pin into said second portion, said pin having an outer dimension greater than the inner dimension of said second portion, thereby to expand said lands and grooves.

6. A sealing plug assembly as defined in claim 5, wherein said screw is a self-locking screw which locks in position for retaining said plug in position.

7. A sealing plug assembly as defined in claim 5, which further includes an expander member receivable in said first portion of said blind opening and having an outer dimension greater than the inner dimension of the bottom of said first portion of said blind opening for expanding said threads on the outer surface of said plug.

* * * * *